(12) United States Patent
Saito et al.

(10) Patent No.: US 9,234,155 B2
(45) Date of Patent: Jan. 12, 2016

(54) REFRIGERATOR OIL COMPOSITION, METHOD FOR PRODUCING SAME, AND WORKING FLUID COMPOSITION FOR REFRIGERATORS

(71) Applicant: JX NIPPON OIL & ENERGY CORPORATION, Tokyo (JP)

(72) Inventors: Masanori Saito, Tokyo (JP); Takeshi Okido, Tokyo (JP); Hiroshi Eto, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/379,363

(22) PCT Filed: Feb. 19, 2013

(86) PCT No.: PCT/JP2013/054013
§ 371 (c)(1),
(2) Date: Aug. 18, 2014

(87) PCT Pub. No.: WO2013/125528
PCT Pub. Date: Aug. 29, 2013

(65) Prior Publication Data
US 2015/0028252 A1   Jan. 29, 2015

(30) Foreign Application Priority Data

Feb. 22, 2012 (JP) .................................. 2012-036442

(51) Int. Cl.
| | |
|---|---|
| C09K 5/04 | (2006.01) |
| C10M 169/04 | (2006.01) |
| C10M 135/20 | (2006.01) |
| C10M 137/04 | (2006.01) |
| C10M 105/32 | (2006.01) |
| C10M 105/38 | (2006.01) |
| C10M 129/74 | (2006.01) |
| C10M 171/00 | (2006.01) |

(52) U.S. Cl.
CPC .............. *C10M 169/04* (2013.01); *C09K 5/042* (2013.01); *C09K 5/045* (2013.01); *C10M 105/32* (2013.01); *C10M 105/38* (2013.01); *C10M 129/74* (2013.01); *C10M 135/20* (2013.01); *C10M 137/04* (2013.01); *C10M 171/008* (2013.01); *C09K 2205/11* (2013.01); *C09K 2205/12* (2013.01); *C09K 2205/126* (2013.01); *C09K 2205/22* (2013.01); *C09K 2205/24* (2013.01); *C10M 2207/283* (2013.01); *C10M 2207/2835* (2013.01); *C10M 2219/082* (2013.01); *C10M 2219/083* (2013.01); *C10M 2219/087* (2013.01); *C10M 2223/04* (2013.01); *C10M 2223/041* (2013.01); *C10N 2220/022* (2013.01); *C10N 2220/028* (2013.01); *C10N 2220/302* (2013.01); *C10N 2220/303* (2013.01); *C10N 2230/06* (2013.01); *C10N 2240/30* (2013.01)

(58) Field of Classification Search
CPC ............... C09K 5/045; C09K 2205/24; C09K 2205/122; C09K 2205/104
USPC ............................................. 252/68; 508/506
See application file for complete search history.

(56) References Cited

U.S. PATENT DOCUMENTS

| | | | | |
|---|---|---|---|---|
| 5,454,963 | A * | 10/1995 | Kaneko ......................... | 508/304 |
| 5,833,876 | A | 11/1998 | Schnur et al. | |
| 6,008,169 | A * | 12/1999 | Kaneko ......................... | 508/501 |
| 6,074,573 | A * | 6/2000 | Kaneko ......................... | 252/68 |
| 6,267,906 | B1 | 7/2001 | Schnur et al. | |
| 6,296,782 | B1 | 10/2001 | Schnur et al. | |
| 8,691,108 | B2 * | 4/2014 | Matsuura et al. ............... | 252/68 |
| 2001/0027655 | A1* | 10/2001 | Tazaki ............................ | 62/114 |
| 2001/0035518 | A1 | 11/2001 | Schnur et al. | |
| 2002/0137640 | A1* | 9/2002 | Memita et al. ................. | 508/485 |
| 2007/0032391 | A1* | 2/2007 | Tagawa et al. ................. | 508/421 |
| 2007/0155635 | A1* | 7/2007 | Tagawa et al. ................. | 508/463 |
| 2010/0038582 | A1* | 2/2010 | Shimomura et al. ........... | 252/67 |
| 2010/0038583 | A1* | 2/2010 | Shimomura et al. ........... | 252/68 |
| 2011/0000253 | A1* | 1/2011 | Sato et al. ....................... | 62/468 |
| 2012/0024007 | A1 | 2/2012 | Ota et al. | |

FOREIGN PATENT DOCUMENTS

| | | |
|---|---|---|
| CN | 1696260 | 11/2005 |
| JP | 05-171174 | 7/1993 |
| JP | 08-503975 | 4/1996 |
| JP | 08-157847 | 6/1996 |
| JP | 09-189453 | 7/1997 |
| JP | 2001-226690 | 8/2001 |
| JP | 2002-356694 | 12/2002 |

(Continued)

OTHER PUBLICATIONS

International Search Report for PCT/JP2013/054013, which was mailed on May 14, 2013.

(Continued)

*Primary Examiner* — Douglas Mc Ginty
(74) *Attorney, Agent, or Firm* — Greenblum & Bernstein, P.L.C.

(57) ABSTRACT

A refrigerating machine oil composition comprising at least one ester additive selected from tetraesters of pentaerythritol and one selected from fatty acids having 5 to 18 carbon atoms and hexaesters of dipentaerythritol and one selected from fatty acids having 5 to 18 carbon atoms, and a base oil that is an ester other than the ester additive, in which the content of the ester additive is 2 to 20 mass % based on the total amount of the refrigerating machine oil composition, and the kinematic viscosity of the refrigerating machine oil composition at 40° C. is 3 to 500 mm²/s.

12 Claims, No Drawings

(56) References Cited

FOREIGN PATENT DOCUMENTS

| | | |
|---|---|---|
| JP | 2005-325151 | 11/2005 |
| JP | 2012-031239 | 2/2012 |
| WO | 93/24585 | 12/1993 |

OTHER PUBLICATIONS

International Preliminary Report on Patentability for PCT/JP2013/054013, which was mailed on Sep. 4, 2014.
Chinese Office action in 201380010063.9, mail date is Mar. 2, 2015.

* cited by examiner

# REFRIGERATOR OIL COMPOSITION, METHOD FOR PRODUCING SAME, AND WORKING FLUID COMPOSITION FOR REFRIGERATORS

TECHNICAL FIELD

The present invention relates to a refrigerating machine oil composition, a method for producing the same, and a working fluid composition for refrigerating machines.

BACKGROUND ART

Conventionally, as refrigerants for cold storage chambers, car air-conditioners, room air-conditioners, industrial refrigerating machines and the like, 1,1,1,2-tetrafluoroethane (R134a), R410A that is a mixed refrigerant of 1/1 (mass ratio) of difluoromethane (R32) and pentafluoroethane (R125), which are hydrofluorocarbons (HFC), and the like have been widely used.

As refrigerating machine oils used together with the above-described HFC refrigerants, there are those into which various additives are blended so as to improve a lubricating property.

It is to be noted that, in a general field of lubricant oils, as antiwear additives for improving a lubricating property, oiliness agents such as alcohols, esters, and long-chain fatty acids, antiwear agents such as phosphates and metal dithiophosphates, and extreme pressure agents such as organic sulfur compounds and organic halogen compounds are known. However, in the case of refrigerating machine oils, only additives which do not precipitate when coexisting with refrigerants and do not have a negative effect on stability can be used, and thus, alcohol or ester oiliness agents, and, among phosphates, triphenyl phosphate and tricresyl phosphate are used.

Moreover, Patent Literature 1 discloses a refrigerating machine lubricant oil to which a phosphorous additive and a specific epoxy compound are added together, Patent Literature 2 discloses a compressor lubricant oil for a HFC refrigerant, to which triphenyl phosphate and tri(alkylphenyl) phosphate are added together, and Patent Literature 3 discloses a refrigerating machine oil for a HFC refrigerant, to which tricresyl phosphate, and an epoxy compound consisting of glycidyl ether, or carbodiimide are added, respectively.

CITATION LIST

Patent Literature

Patent Literature 1: Japanese Patent Application Laid-Open No. 5-171174
Patent Literature 2: Japanese Patent Application Laid-Open No. 8-157847
Patent Literature 3: Japanese Patent Application Laid-Open No. 9-189453

SUMMARY OF INVENTION

Technical Problem

By the way, the above-described HFC refrigerants have an ozone-depleting potential (ODP) of zero, but have a high global warming potential (GWP), such as 1000 or more, and thus, the use is limited by so-called F-Gas Regulation.

As alternative refrigerants to the above-described HFC refrigerants, hydrofluoroolefins (HFO) such as 2,3,3,3-tetrafluoropropene (HFO-1234yf), and low GWP refrigerants such as difluoromethane (R32) attract attention in conjunction with the thermodynamic properties. For example, the GWP of HFO-1234yf is low, such as 4. Although the GWP of R32 is slightly high, such as 675, R32 is examined as a likely candidate because it has a high gas pressure and is a high efficiency refrigerant. These refrigerants are examined to be used alone or as a mixed refrigerant with other refrigerants in consideration of the balance of the GWP and various properties.

Moreover, hydrocarbon refrigerants such as isobutane (R600a) and propane (R290) have a low GWP, such as 20 or less, and suitable physical property values, and thus, they have been already in practical use for cold storage chambers while they are combustible.

Among the above-described refrigerants, R32, a mixed refrigerant containing R32 or the like becomes high pressure when being used, the compressor discharge temperature becomes high, and an oil film of a refrigerating machine oil in which a refrigerant is dissolved becomes thin, thereby resulting in severe lubrication conditions.

Moreover, since hydrocarbon refrigerants do not contain, in a hydrocarbon molecule, fluorine that improves a lubricating property, the improvement of the lubricating property by the refrigerant is not expected in contrast to HFC refrigerants and the like. Furthermore, since the solubility of the hydrocarbon refrigerants in a refrigerating machine oil is high, also in this case, the viscosity of the refrigerating machine oil is decreased and lubrication conditions become severe.

If the above-described conventional refrigerating machine oils for HFC refrigerants are directly diverted to refrigerating machine oils used together with these refrigerants having a GWP of 700 or less (hereinafter, collectively referred to as "low GWP refrigerants" in some cases), it is difficult to obtain a sufficient lubricating property.

For example, among additives used for the above-described conventional refrigerating machine oils for HFC refrigerants, oiliness agents form lubricating films by adsorption, and thus, while a friction coefficient can be maintained low in the case where load conditions are relatively mild, for example in a mixed lubrication regime, an antiwear effect is lost as load conditions become severe.

Moreover, triphenyl phosphate and tricresyl phosphate have a certain degree of an antiwear effect, but it is insufficient as an antiwear property under coexistence of a low GWP refrigerant, in which lubrication conditions are severe.

The present invention has been made in view of the subject of the conventional art, and it is an object of the present invention to provide a refrigerating machine oil composition for a compatible refrigerant, which has a large antiwear effect and excels in long-time reliability even under severe lubrication conditions, such as under coexistence of a low GWP refrigerant, a method for producing the same, and a working fluid composition for refrigerating machines.

Solution to Problem

In order to solve the above-described subject, the present invention provides a refrigerating machine oil composition comprising at least one ester additive selected from tetraesters of pentaerythritol and one selected from fatty acids having 5 to 18 carbon atoms and hexaesters of dipentaerythritol and one selected from fatty acids having 5 to 18 carbon atoms, and a base oil that is an ester other than the ester additive, in which the content of the ester additive is 2 to 20 mass % based on the total amount of the refrigerating machine oil composition, and the kinematic viscosity of the refrigerating machine oil composition at 40° C. is 3 to 500 mm²/s.

In this manner, by blending a predetermined amount of the above-described specific ester additive into the base oil that is an ester other than the ester additive, and furthermore, by making the kinematic viscosity of the refrigerating machine oil composition at 40° C. be within the above-described range, an antiwear property of a refrigerating machine oil can be drastically improved without negative effects on other properties under coexistence of a low GWP refrigerant.

Here, a constituent fatty acid of the ester additive is, as described above, one selected from fatty acids having 5 to 18 carbon atoms. That is, the constituent fatty acid of the ester additive needs to be a single composition.

In contrast, the base oil that is an ester other than the ester additive includes all esters other than the above-described ester additive. For example, if a constituent alcohol of the ester is pentaerythritol and/or dipentaerythritol and fatty acids having 5 to 18 carbon atoms are contained in a constituent fatty acid, in the case where the constituent fatty acid is a mixed fatty acid of two or more selected from fatty acids having 5 to 18 carbon atoms, or in the case where the constituent fatty acid is a mixed fatty acid of one, or two or more selected from fatty acids having 5 to 18 carbon atoms and one, or two or more of other fatty acids, these esters can be used as the base oil.

It is to be noted that, in the case where the constituent alcohol of the ester that is the base oil is pentaerythritol and/or dipentaerythritol and the constituent fatty acid is a mixed fatty acid containing fatty acids having 5 to 18 carbon atoms, tetraesters of pentaerythritol and one selected from fatty acids having 5 to 18 carbon atoms and/or hexaesters of dipentaerythritol and one selected from fatty acids having 5 to 18 carbon atoms can be generated when synthesizing the base oil. However, according to the examination of the present inventors, if such an ester is used as the base oil, an antiwear property improving effect as when the above-described ester additive is blended into the base oil cannot be observed. In other words, an antiwear property effect according to the present invention is exerted only by blending the above-described ester additive into the base oil that is an ester other than the ester additive, and can be said to be an unexpected remarkable effect.

In the present invention, the above-described ester additive is preferably at least one selected from pentaerythritoltetra(2-ethylhexanoate) and dipentaerythritolhexa(hexanoate).

Moreover, the kinematic viscosity of the refrigerating machine oil composition at 40° C. is preferably 3 to 300 mm²/s.

Furthermore, the above-described base oil is preferably a polyol ester.

Additionally, the above-described base oil is preferably a polyol ester obtained from pentaerythritol and a mixed acid of a carboxylic acid having 4 to 7 carbon atoms and 3,5,5-trimethylhexanoic acid.

Moreover, the above-described base oil is preferably a polyol ester which is obtained from pentaerythritol, a branched butanoic acid, and 3,5,5-trimethylhexanoic acid, and whose kinematic viscosity at 40° C. is 30 to 110 mm²/s.

Moreover, the content of the above-described ester additive is preferably 2 to 7 mass % based on the total amount of the refrigerating machine oil composition.

Moreover, the refrigerating machine oil composition of the present invention preferably further comprises 0.1 to 5 mass % of a phosphate and/or 0.01 to 2 mass % of a sulfide compound based on the total amount of the refrigerating machine oil composition.

The above-described phosphate is preferably at least one selected from triphenyl phosphate, tricresyl phosphate, and alkylphenyl phosphates having an alkyl group having 3 or 4 carbon atoms.

Moreover, the above-described sulfide compound is preferably a thiobisphenol compound.

Moreover, the present invention provides a method for producing a refrigerating machine oil composition including a step of blending at least one ester additive selected from tetraesters of pentacrythritol and one selected from fatty acids having 5 to 18 carbon atoms and hexaesters of dipentaerythritol and one selected from fatty acids having 5 to 18 carbon atoms into at least one base oil selected from mineral oils and synthetic oils to obtain the refrigerating machine oil composition, in which the content of the ester additive is 2 to 20 mass % based on the total amount of the refrigerating machine oil composition, and the kinematic viscosity of the refrigerating machine oil composition at 40° C. is 3 to 500 mm²/s.

Moreover, the present invention provides a working fluid composition for refrigerating machines which comprises the above-described refrigerating machine oil composition of the present invention, and a refrigerant containing at least one selected from hydrofluorocarbons, hydrofluoroolefins, and hydrocarbons, and whose global warming potential (GWP) is 700 or less.

The above-described refrigerant preferably contains difluoromethane (R32).

Advantageous Effects of Invention

As described above, the refrigerating machine oil composition of the present invention can maintain a low friction coefficient along with an antiwear effect, and exerts an excellent effect of capable of being stably used for long periods, even under severe lubrication load conditions with a low GWP refrigerant coexisting.

DESCRIPTION OF EMBODIMENTS

Hereinafter, suitable embodiments of the present invention will be described in detail.

[First Embodiment: Refrigerating Machine Oil Composition and Method for Producing Same]

A refrigerating machine oil composition according to a first embodiment of the present invention comprises at least one ester additive selected from tetraesters of pentaerythritol and one selected from fatty acids having 5 to 18 carbon atoms and hexaesters of dipentaerythritol and one selected from fatty acids having 5 to 18 carbon atoms, and a base oil that is an ester other than the ester additive. In the refrigerating machine oil composition, the content of the ester additive is 2 to 20 mass % based on the total amount of the refrigerating machine oil composition, and the kinematic viscosity of the refrigerating machine oil composition at 40° C. is 3 to 500 mm²/s.

A constituent alcohol of the ester additive is pentaerythritol and/or dipentaerythritol, and the ester additive is a complete ester in the case where either alcohol is used. It is to be noted that the constituent alcohol may contain impurities which are inevitably contained in a normal production process.

Moreover, a constituent fatty acid of the ester additive is one selected from fatty acids having 5 to 18 carbon atoms and needs to be a single composition. However, in the case where two or more of tetraesters of pentaerythritol and hexaesters of dipentaerythritol are used in combination, the constituent fatty acids of the respective complete esters may be the same or different from each other, as long as the constituent fatty acid in one molecule is a single composition. It is to be noted that the constituent fatty acid may contain impurities which are inevitably contained in a normal production process.

Moreover, the fatty acids having 5 to 18 carbon atoms may be either saturated fatty acids or unsaturated fatty acids, and may be straight-chain fatty acids or branched fatty acids. Specifically, examples of the fatty acids include saturated fatty acids such as straight-chain or branched pentanoic acid, straight-chain or branched hexanoic acid, straight-chain or branched heptanoic acid, straight-chain or branched octanoic acid, straight-chain or branched nonanoic acid, straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, and straight-chain or branched octadecanoic acid; and unsaturated fatty acids such as straight-chain or branched pentenoic acid, straight-chain or branched hexenoic acid, straight-chain or branched heptenoic acid, straight-chain or branched octenoic acid, straight-chain or branched nonenoic acid, straight-chain or branched decenoic acid, straight-chain or branched undecenoic acid, straight-chain or branched dodecenoic acid, straight-chain or branched tridecenoic acid, straight-chain or branched tetradecenoic acid, straight-chain or branched pentadecenoic acid, straight-chain or branched hexadecenoic acid, straight-chain or branched heptadecenoic acid, and straight-chain or branched octadecenoic acid.

The number of carbon atoms of the constituent fatty acid of the ester additive is 5 to 18, preferably 5 to 12, and more preferably 6 to 9. When the number of carbon atoms of the constituent fatty acid is less than 5, an antiwear property improving effect is insufficient, and when it exceeds 18, solubility into a base oil at low temperature is decreased.

The ester additive can be obtained by a dehydration condensation reaction of pentaerythritol and/or dipentaerythritol and one selected from the fatty acids having 5 to 18 carbon atoms. It is to be noted that although a small amount of partial esters generated in producing the ester additive may be contained as an impurity, the acid value of the ester additive is preferably 0.1 mgKOH/g or less and the hydroxyl value thereof is preferably 10 mgKOH/g or less.

The content of the ester additive is 2 to 20 mass %, preferably 2 to 15 mass %, and more preferably 2 to 7 mass % based on the total amount of the refrigerating machine oil composition. When the content of the ester additive is less than 2 mass % or exceeds 20 mass %, an antiwear property improving effect becomes insufficient. The content can be appropriately selected within the range depending on the kind of a base oil, the kinematic viscosity and the like.

Moreover, the base oil in the first embodiment is an ester other than the above-described ester additive. Esters can be obtained by a dehydration condensation reaction of alcohols and fatty acids, and in the present embodiment, in terms of chemical stability, examples of a preferred base oil component include diesters of dibasic acids and monohydric alcohols, polyol esters of polyols (in particular, neopentyl polyols) and fatty acids, and complex esters of polyols, polybasic acids, and monohydric alcohols (or fatty acids). Among them, polyol esters which excel in stability are preferable.

Furthermore, among the polyol esters, an ester synthesized from pentaerythritol, a carboxylic acid having 4 to 7 carbon atoms, and 3,5,5-trimethylhexanoic acid is preferable because a lubricating property improving effect due to blending of the ester additive is large, and a polyol ester in which the carboxylic acid having 4 to 7 carbon atoms is a branched butanoic acid is more preferable. Furthermore, the kinematic viscosity of the polyol ester of pentaerythritol, a branched butanoic acid, and 3,5,5-trimethylhexanoic acid at 40° C. is preferably 30 to 110 mm$^2$/s.

Moreover, as the base oil according to the present embodiment, an ester of polyhydric alcohols and fatty acids, in which the molar ratio of fatty acids having 4 to 6 carbon atoms and branched fatty acids having 7 to 9 carbon atoms in the above-described fatty acids is 15:85 to 90:10, the above-described fatty acids having 4 to 6 carbon atoms contain 2-methylpropanoic acid, and the ratio of the sum of the fatty acids having 4 to 6 carbon atoms and the branched fatty acids having 7 to 9 carbon atoms to the total amount of the fatty acids which constitute the above-described ester is 20 mol % or more, (hereinafter referred to as "polyhydric alcohol fatty acid ester (A)") can be preferably used.

It is to be noted that although the polyhydric alcohol fatty acid ester (A) includes complete esters in which all of hydroxyl groups in polyhydric alcohols are esterified, partial esters in which a part of hydroxyl groups in polyhydric alcohols remains unesterified, and a mixture of complete esters and partial esters, the hydroxyl value of the polyhydric alcohol fatty acid ester (A) is preferably 10 mgKOH/g or less, further preferably 5 mgKOH/g or less, and the most preferably 3 mgKOH/g or less.

In the fatty acids which constitute the polyhydric alcohol fatty acid ester (A), the molar ratio of the fatty acids having 4 to 6 carbon atoms and the branched fatty acids having 7 to 9 carbon atoms is 15:85 to 90:10, preferably 15:85 to 85:15, more preferably 20:80 to 80:20, further preferably 25:75 to 75:25, and the most preferably 30:70 to 70:30. Moreover, the ratio of the sum of the fatty acids having 4 to 6 carbon atoms and the branched fatty acids having 7 to 9 carbon atoms to the total amount of the fatty acids which constitute the polyhydric alcohol fatty acid ester (A) is 20 mol % or more. In the case of not satisfying the above-described conditions relating to a fatty acid composition, it becomes difficult to achieve both sufficient compatibility with a refrigerant (in particular, difluoromethane refrigerant) and necessary viscosity as a refrigerating machine oil in a high level. It is to be noted that the ratio of the fatty acids herein is a value based on the total amount of the fatty acids which constitute the polyhydric alcohol fatty acid ester (A) contained in a refrigerating machine oil.

Specifically, examples of the fatty acids having 4 to 6 carbon atoms include butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid. Among them, one having a branch in an alkyl skeleton, such as 2-methylpropanoic acid, is preferable.

Specifically, examples of the branched fatty acids having 7 to 9 carbon atoms include 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid.

The polyhydric alcohol fatty acid ester (A) has the molar ratio of the fatty acids having 4 to 6 carbon atoms and the branched fatty acids having 7 to 9 carbon atoms of 15:85 to 90:10, and may contain fatty acids other than the fatty acids having 4 to 6 carbon atoms and the branched fatty acids having 7 to 9 carbon atoms as a constituent acid component as long as the fatty acids having 4 to 6 carbon atoms contain 2-methylpropanoic acid.

Specifically, examples of the fatty acids other than the fatty acids having 4 to 6 carbon atoms and the branched fatty acids having 7 to 9 carbon atoms include fatty acids having 2 or 3 carbon atoms, such as acetic acid and propionic acid; straight-chain fatty acids having 7 to 9 carbon atoms, such as heptanoic acid, octanoic acid, and nonanoic acid; and fatty acids having 10 to 20 carbon atoms, such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid.

In the case where the fatty acids having 4 to 6 carbon atoms and the branched fatty acids having 7 to 9 carbon atoms, and fatty acids other than these fatty acids are used in combination, the ratio of the sum of the fatty acids having 4 to 6 carbon atoms and the branched fatty acids having 7 to 9 carbon atoms to the total amount of the fatty acids which constitute the polyhydric alcohol fatty acid ester (A) is required to be 20 mol % or more, preferably 25 mol % or more, more preferably 30 mol % or more, and furthermore, more preferably 80 mol % or more. Due to this ratio of 20 mol % or more, compatibility with a refrigerant (in particular, difluoromethane refrigerant) becomes sufficient.

Among the polyhydric alcohol fatty acid ester (A), one in which an acid constituent component consists of only 2-methylpropanoic acid and 3,5,5-trimethylhexanoic acid is particularly preferable in terms of achieving both ensuring of necessary viscosity and compatibility with a refrigerant (in particular, difluoromethane refrigerant).

The polyhydric alcohol fatty acid ester (A) according to the present embodiment may be a mixture of two or more esters having different molecular structures, and in such a case, an individual molecule is not necessary to satisfy the above-described conditions as long as fatty acids as a whole which constitute pentaerythritol fatty acid esters contained in the refrigerating machine oil satisfy the above-described conditions.

As described above, the polyhydric alcohol fatty acid ester (A) requires the fatty acids having 4 to 6 carbon atoms and the branched fatty acids having 7 to 9 carbon atoms as an acid component which constitutes the ester, and contains other fatty acids as a constituent component if necessary. That is, although the polyhydric alcohol fatty acid ester (A) may contain only two fatty acids as an acid constituent component, or three or more fatty acids having different structures as an acid constituent component, it is preferable that the polyhydric alcohol fatty acid ester contain, as an acid constituent component, only fatty acids in which a carbon atom adjacent to carbonyl carbon ($\alpha$-position carbon atom) is not quaternary carbon. In the case where a fatty acid in which an $\alpha$-position carbon atom is quaternary carbon is contained in the fatty acids which constitute the polyhydric alcohol fatty acid ester, a lubricating property in the presence of a difluoromethane refrigerant tends to be insufficient.

Moreover, as polyhydric alcohols which constitute the polyhydric alcohol fatty acid ester (A), polyhydric alcohols having 2 to 6 hydroxyl groups are preferably used.

Specifically, examples of dihydric alcohols (diols) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Moreover, specifically, examples of trivalent or more alcohols include polyhydric alcohols, such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to trimer of glycerin), 1,3,5-pentanetriol, sorbitol, sorbitan, sorbitol-glycerin condensate, adonitol, arabitol, xylitol, and mannitol; sugars, such as xylose, arabinose, ribose, rhamnose, glucose, fructose, galactose, mannose, sorbose, and cellobiose; and partially etherified products thereof. Among them, because of having higher hydrolytic stability, esters of hindered alcohols, such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol) are more preferable, esters of neopentyl glycol, trimethylolethane, trimethylolpropane, trimethylolbutane, pentaerythritol, and di-(pentaerythritol) are further more preferable, neopentyl glycol, trimethylolpropane, pentaerythritol, and di-(pentaerythritol) are further preferable, and because of having particularly higher compatibility with a refrigerant and hydrolytic stability, pentaerythritol, di-(pentaerythritol), or a mixed ester of pentaerythritol and di-(pentaerythritol) is the most preferable.

Preferred examples of the constituent fatty acid of the polyhydric alcohol fatty acid ester (A) include as follows:

(i) a combination of 1 to 13 kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, and 1 to 13 kinds selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 1 to 13 kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, and 1 to 25 kinds selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 1 to 13 kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, and 1 to 50 kinds selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

More preferred examples of the acid constituent component which constitutes the polyhydric alcohol fatty acid ester (A) include as follows:

(i) a combination of 2-methylpropanoic acid and 1 to 13 kinds selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 2-methylpropanoic acid and 1 to 25 kinds selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 2-methylpropanoic acid and 1 to 50 kinds selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,4-trimethylhexanoic acid, 2,2,5-trimethylhexanoic acid, 2,3,3-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

The content of the polyhydric alcohol fatty acid ester (A) is 50 mass % or more, preferably 60 mass % or more, more preferably 70 mass % or more, and further preferably 75 mass % or more based on the total amount of the refrigerating machine oil. It is to be noted that the refrigerating machine oil composition according to the present embodiment may contain the polyhydric alcohol fatty acid ester (A) and other esters as a base oil, and may also further contain additives other than the ester additive, which will be described below, but when the polyhydric alcohol fatty acid ester (A) is less than 50 mass %, it is impossible to achieve both necessary viscosity and compatibility in a high level at the same time.

In the case where the refrigerating machine oil composition according to the present embodiment contains the polyhydric alcohol fatty acid ester (A) as a base oil, only the polyhydric alcohol fatty acid ester (A) may be used alone (that is, the content of the polyhydric alcohol fatty acid ester (A) is 100 mass % based on the total amount of the base oil), and in addition to this, to a degree not impairing its excellent performance, other esters other than the polyhydric alcohol fatty acid ester (A) may be further contained as a base oil. Examples of the base oil other than the polyhydric alcohol fatty acid ester (A) include polyol esters, complex esters, and alicyclic dicarboxylic acid esters other than the ester additive and the polyhydric alcohol fatty acid ester (A).

Examples of the polyol esters other than the polyhydric alcohol fatty acid ester (A) include esters of polyhydric alcohols, such as neopentyl glycol, trimethylolethane, trimethylolpropane, trimethylolbutane, pentaerythritol, and dipentaerythritol, and fatty acids, and esters of neopentyl glycol and fatty acids, esters of pentaerythritol and fatty acids, and esters of dipentaerythritol and fatty acids are particularly preferable.

As neopentyl glycol esters, esters of neopentyl glycol and fatty acids having 5 to 9 carbon atoms are preferable. Specifically, examples of these neopentyl glycol esters include neopentyl glycol di-3,5,5-trimethylhexanoate, neopentyl glycol di-2-ethylhexanoate, neopentyl glycol di-2-methylhexanoate, neopentyl glycol di-2-ethylpentanoate, an ester of neopentyl glycol and 2-methylhexanoic acid/2-ethylpentanoic acid, an ester of neopentyl glycol and 3-methylhexanoic acid/5-methylhexanoic acid, an ester of neopentyl glycol and 2-methylhexanoic acid/2-ethylhexanoic acid, an ester of neopentyl glycol and 3,5-dimethylhexanoic acid/4,5-dimethylhexanoic acid/3,4-dimethylhexanoic acid, neopentyl glycol dipentanoate, neopentyl glycol di-2-ethylbutanoate, neopentyl glycol di-2-methylpentanoate, neopentyl glycol di-2-methylbutanoate, and neopentyl glycol di-3-methylbutanoate.

As pentaerythritol esters, esters of pentaerythritol and a mixed fatty acid of two or more selected from fatty acids having 5 to 9 carbon atoms are preferable. Specifically, examples of these pentaerythritol esters include esters of pentaerythritol and two or more fatty acids selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

As dipentaerythritol esters, esters of dipentaerythritol and a mixed fatty acid of two or more selected from fatty acids having 5 to 9 carbon atoms are preferable. Specifically, examples of these dipentaerythritol esters include esters of dipentaerythritol and two or more fatty acids selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

In the case where the refrigerating machine oil composition according to the present embodiment contains esters other than the ester additive and the polyhydric alcohol fatty acid ester (A), although there is no particular limitation of the content of oxygen-containing synthetic oils other than the polyhydric alcohol fatty acid ester (A) as long as excellent lubricating property and compatibility of the refrigerating machine oil according to the present embodiment are not impaired, the content of the polyol esters other than the ester additive and the polyhydric alcohol fatty acid ester (A) is preferably less than 50 mass %, more preferably 45 mass % or less, further preferably 40 mass % or less, further more preferably 35 mass % or less, much more preferably 30 mass % or less, and the most preferably 25 mass % or less based on the total amount of the refrigerating machine oil; and in the case where esters other than the polyol esters are blended as a base oil, the content thereof is preferably less than 50 mass %, more preferably 40 mass % or less, and further preferably 30 mass % or less based on the total amount of the refrigerating machine oil. If the content of the polyol esters and other esters other than the pentaerythritol fatty acid esters is too much, it becomes difficult to obtain the effect by the use of the ester additive and the polyhydric alcohol fatty acid ester (A).

It is to be noted that the polyol esters other than the polyhydric alcohol fatty acid ester (A) may be partial esters in which a part of hydroxyl groups in polyhydric alcohols are not esterified and remains as hydroxyl groups, complete esters in which all of hydroxyl groups are esterified, or a mixture of partial esters and complete esters, and it is preferable that the hydroxyl value be preferably 10 mgKOH/g or less, further preferably 5 mgKOH/g or less, and the most preferably 3 mgKOH/g or less.

Moreover, in the case where the refrigerating machine oil according to the present embodiment contains the polyol esters other than the polyhydric alcohol fatty acid ester (A), as the polyol esters, one consisting of one polyol ester having a single structure may be contained, or a mixture of two or more polyol esters having different structures may be contained.

Moreover, the polyol esters other than the polyhydric alcohol fatty acid ester (A) may be any of esters of one fatty acid and one polyhydric alcohol, esters of two or more fatty acids and one polyhydric alcohol, esters of one fatty acid and two or more polyhydric alcohols, and esters of two or more fatty acids and two or more polyhydric alcohols, as long as they have different structures from the ester additive and the polyhydric alcohol fatty acid ester.

Moreover, the refrigerating machine oil composition according to the present embodiment may further contain various additives described below.

The refrigerating machine oil composition according to the present embodiment can further contain phosphates. The phosphates in themselves have a function as an antiwear additive, and by using the above-described ester additive and the phosphates in combination, an antiwear property of the refrigerating machine oil composition can be remarkably improved.

Examples of preferred phosphates include triphenyl phosphate (TPP), tricresyl phosphate (TCP), and alkylphenyl phosphates (APP) having an alkyl group having 3 or 4 carbon atoms. Furthermore, as APP, a mixture of one having one alkylphenyl group (mono-type), one having two alkylphenyl groups (di-type), and one having three alkylphenyl groups (tri-type) can be used, and the mixing ratio thereof is not particularly limited.

The content of the phosphates is, in terms of further antiwear property improving effect and stability, preferably 0.1 to 3 mass %, and more preferably 0.2 to 2 mass % based on the total amount of the refrigerating machine oil composition.

Moreover, the refrigerating machine oil composition according to the present embodiment can further contain sulfide compounds. The sulfide compounds in themselves have a function as an antiwear additive, and by using the above-described ester additive and the sulfide compounds in combination, an antiwear property of the refrigerating machine oil composition can be remarkably improved.

As the sulfide compounds, monosulfide compounds are preferable. This is because, sulfur compounds having high activity, such as disulfide compounds, deteriorate stability of the refrigerating machine oil and change quality of copper commonly used inside of refrigerating equipment.

As the sulfide compounds, in particular, thiobisphenol compounds, which have antioxidant, that is, radical scavenging capacity and are also a stabilizer, are preferable.

The content of the sulfide compounds is preferably 0.05 to 2 mass %, and more preferably 0.1 to 1 mass % based on the total amount of the refrigerating machine oil composition. When the content of the sulfide compounds is less than 0.05 mass %, it tends to become difficult to obtain a further antiwear property improving effect due to the blending of the sulfide compounds, and when it exceeds 2 mass %, corrosive wear may occur depending on the atmosphere used.

Furthermore, in the present embodiment, the phosphates and the sulfide compounds may be used in combination.

Moreover, in order to further improve performance, the refrigerating machine oil composition according to the present embodiment can contain additives which are conventionally used for a lubricant oil, such as an antioxidant, a friction modifier, a wear inhibitor, an extreme pressure agent, a rust-preventive agent, a metal deactivator, and an antifoamer, within a range not impairing the object of the present invention.

Examples of the antioxidant include phenol compounds such as di-tert-butyl-p-cresol and amine compounds such as alkyldiphenylamines, examples of the friction modifier include aliphatic amines, aliphatic amides, aliphatic imides, alcohols, esters, amine salts of acid phosphate, and amine salts of phosphite, examples of the wear inhibitor include zinc dialkyldithiophosphates, examples of the extreme pressure agent include sulfurized olefins and sulfurized fats and oils, examples of the rust-preventive agent include alkenyl succinic acid esters and partial esters, examples of the metal deactivator include benzotriazoles, and examples of the antifoamer include silicone compounds and polyester compounds.

The kinematic viscosity of the refrigerating machine oil composition according to the present embodiment at 40° C. is 3 to 500 mm$^2$/s, preferably 3 to 300 mm$^2$/s, and further preferably 5 to 150 mm$^2$/s. Moreover, the viscosity index of the refrigerating machine oil composition is preferably 10 or more. It is to be noted that the kinematic viscosity at 40° C. and the viscosity index in the present invention mean values measured in conformity with JIS K2283.

Although other properties are not particularly limited, the pour point of the refrigerating machine oil composition is preferably −10° C. or less, and more preferably −20° C. or less. Moreover, the flash point of the refrigerating machine oil composition is preferably 120° C. or more, and more preferably 200° C. or more. It is to be noted that the pour point can be measured in conformity with JIS K2269 "Testing Methods for Pour Point and Cloud Point of Crude Oil and Petroleum Products", and furthermore, the flash point can be measured in conformity with Testing Method for Flash Point by Tag closed cup method of JIS K2265 "Crude Oil and Petroleum Products-Testing Method for Flash Point".

Moreover, the acid value of the refrigerating machine oil composition is not particularly limited, but can be preferably 0.1 mgKOH/g or less, and more preferably 0.05 mgKOH/g or less so as to prevent corrosion of metals used for refrigerating machines or piping and suppress deterioration of the refrigerating machine oil itself. It is to be noted that the acid value in the present invention means an acid value measured in conformity with JIS K2501 "Petroleum products and lubricants-Determination of neutralization number".

Moreover, the water content of the refrigerating machine oil composition is not particularly limited, but is preferably 200 ppm or less, more preferably 100 ppm or less, and the most preferably 50 ppm or less. In particular, in the case of being used for sealed refrigerating machines, from the viewpoint of stability and an electrical insulation property of the refrigerating machine oil, the water content is required to be small.

The refrigerating machine oil composition according to the present embodiment can be obtained by blending the above-described ester additive into the base oil that is an ester other than the ester additive such that the content of the ester additive is 2 to 20 mass % based on the total amount of the refrigerating machine oil composition and the kinematic viscosity of the obtained refrigerating machine oil composition at 40° C. is 3 to 500 mm$^2$/s. It is to be noted that, in the case where the refrigerating machine oil composition contains components other than the ester additive and the base oil (the above-described phosphates, the sulfide compounds and the like), the blending of these components into the base oil may be the same time as the ester additive, and may be before blending or after blending of the ester additive.

A refrigerant used together with the refrigerating machine oil composition according to the present embodiment is not particularly limited, but a refrigerant that is compatible with the refrigerating machine oil composition, that is, a refrigerant that is compatible with the refrigerating machine oil composition without being separated into two layers at ordinary temperature is preferable. Furthermore, the refrigerating machine oil composition according to the present embodiment can achieve an excellent antiwear property under severe lubrication conditions, which was difficult to be achieved by a conventional refrigerating machine oil, and is useful when being used together with hydrofluoroolefins (HFO) such as 2,3,3,3-tetrafluoropropene (HFO-1234yf), low GWP refrigerants such as difluoromethane (R32), or hydrocarbon refrigerants such as isobutane (R600a) and propane (R290). A working fluid composition for refrigerating machines using these refrigerants will be described in detail in a second embodiment described below.

[Second Embodiment: Working Fluid Composition for Refrigerating Machines]

The working fluid composition for refrigerating machines according to the second embodiment of the present invention contains the refrigerating machine oil composition according to the above-described first embodiment, and a refrigerant which contains at least one selected from hydrofluorocarbons, hydrofluoroolefins, and hydrocarbons, and whose global warming potential (GWP) is 700 or less. It is to be noted that a refrigerating machine oil composition in the present embodiment is the same as the case of the above-described first embodiment, and thus, an overlapped description is omitted here.

Examples of hydrofluorocarbons (HFC) having a GWP of 700 or less include R32 and a mixed refrigerant containing a large amount of R32 (R410A and the like), which are hydrofluorocarbons (HFC) having a low boiling point and high pressure. Since these HFC refrigerants have a feature of having a high boiling point and high pressure, and the compressor discharge temperature when using them becomes high, an oil film becomes thin, thereby resulting in severe lubrication conditions. Thus, in the case of using a conventional refrigerating machine oil, an antiwear property becomes insufficient. In contrast, according to the present embodiment, even in the case of using the above-described HFC refrigerants, an excellent antiwear property can be achieved.

Moreover, examples of hydrofluoroolefins (HFO) having a GWP of 700 or less include 2,3,3,3-tetrafluoropropene (HFO-1234yf), 1,3,3,3-tetrafluoropropene (HFO-1234ze), and 1,2,3,3,3-pentafluoropropene (HFO-1225ye). These HFO refrigerants have, in a molecule, an olefinic structure that is easy to be decomposed, and thus, have a feature of a low GWP but low stability. In particular, under severe lubrication conditions, local heating at a sliding part due to metal/metal contact facilitates decomposition of the refrigerant as well as wear. Thus, in the case of using a conventional refrigerating machine oil, a working fluid in which a refrigerant is compatible with a refrigerating machine oil may deteriorate. In contrast, according to the present embodiment, even in the case of using the above-described HFO refrigerants, an excellent antiwear property can be achieved without impairing stability of the working fluid composition for refrigerating machines.

Moreover, examples of hydrocarbon refrigerants having a GWP of 700 or less include saturated hydrocarbons having 3 to 6 carbon atoms, in particular, isobutane (R600a) and propane (R290). These hydrocarbon refrigerants do not contain, in a hydrocarbon molecule, fluorine that contributes to the improvement of a lubricating property and have high solubility in a refrigerating machine oil, thereby resulting in decrease in viscosity of the refrigerating machine oil and severe lubrication conditions. Thus, in the case of using a conventional refrigerating machine oil, an antiwear property becomes insufficient. In contrast, according to the present embodiment, even in the case of using the above-described hydrocarbon refrigerants, an excellent antiwear property can be achieved.

EXAMPLES

Hereinafter, the present invention will be described in detail with reference to Examples and Comparative Examples, but the present invention is not limited to the following Examples.

Examples 1 to 12, Comparative Examples 1 to 12

In Examples 1 to 12 and Comparative Examples 1 to 12, refrigerating machine oil compositions having compositions shown in Tables 1 to 3 were prepared, respectively, using base oils and additives shown below.

(A) Ester Base Oils (A-1) POE-1: ester of pentaerythritol and a mixed acid of 2-methylpropanoic acid and 3,5,5-trimethylhexanoic acid at the mass ratio of 7:3 (kinematic viscosity at 40° C.: 34.4 mm²/s, viscosity index: 77)

(A-2) POE-2: ester of pentaerythritol and a mixed acid of 2-methylpropanoic acid and 2-ethylhexanoic acid at the mass ratio of 3:7 (kinematic viscosity at 40° C.: 36.7 mm²/s, viscosity index: 78)

(A-3) POE-3: ester of dipentaerythritol and a mixed acid of n-butanoic acid and 3,5,5-trimethylhexanoic acid at the mass ratio of 7:3 (kinematic viscosity at 40° C.: 65.1 mm²/s, viscosity index: 90)

(A-4) POE-4: ester of pentaerythritol and a mixed acid of n-pentanoic acid, n-heptanoic acid, and 3,5,5-trimethylhexanoic acid at the mass ratio of 4:4:2 (kinematic viscosity at 40° C.: 28.5 mm²/s, viscosity index: 133)

(A-5) POE-5: ester of trimethylolpropane and oleic acid (kinematic viscosity at 40° C.: 48.3 mm²/s, viscosity index: 176)

(B) Ester Additives (B-1) PE2EH: pentaerythritoltetra(2-ethylhexanoate) (tetraester of pentaerythritol and 2-ethylhexanoic acid, acid value: 0.01 mgKOH/g, hydroxyl value: 1 mgKOH/g)

(B-2) DPEH: dipentaerythritolhexa(hexanoate) (hexaester of dipentaerythritol and n-hexanoic acid, acid value: 0.01 mgKOH/g, hydroxyl value: 1 mgKOH/g)

(C) Other Additives (C-1) tricresyl phosphate (TCP)
(C-2) triphenyl phosphate (TPP)
(C-3) tridecyl phosphate (TDP)
(C-4) dibenzyl sulfide
(C-5) didodecyl sulfide
(C-6) 4,4'-thiobis(3-methyl-6-tert-butylphenol)

Next, the following evaluation tests were carried out by combining the refrigerating machine oil compositions of Examples 1 to 12 and Comparative Examples 1 to 12 with refrigerants shown in Tables 1 to 3, respectively.

(Lubricating Property Test)

In a lubricating property test, a high-pressure atmosphere friction tester (rotating and sliding system with rotating vane material and fixed disk material) manufactured by Shinko Engineering Co., Ltd., which can provide a refrigerant atmosphere similar to an actual compressor, was used. Basic test conditions were oil quantity: 600 ml, test temperature: 110° C., rotation frequency: 500 rpm, applied load: 100 kgf, and test time: 1 hour, SKH-51 was used as the vane material, and FC250 was used as the disk material.

The test was carried out under the following four test conditions depending on the kind of a refrigerant.

Lubricating Property Test-(1): R32 was used as a refrigerant, and the pressure in the test vessel was made to be 3.1 MPa.

Lubricating Property Test-(2): HFO-1234yf (abbreviated to yf in Tables) was used as a refrigerant, and the pressure in the test vessel was made to be 1.6 MPa.

Lubricating Property Test-(3): R410A (R32/R125=1/1 at mass ratio) was used as a refrigerant, and the pressure in the test vessel was made to be 3.1 MPa.

Lubricating Property Test-(4): The test was carried out by blending 20% of n-hexane (abbreviated to n-C6 in Tables) at the volume ratio with respect to the refrigerating machine oil composition (used as an alternative to hydrocarbon refrigerants such as R290). The pressure became slightly higher than normal pressure.

It is to be noted that evaluation of an antiwear property was carried out based on the wear loss of the vane material, because the wear loss of the disk material was extremely small. The obtained results are shown in Tables 1 to 3.

(Stability Test)

90 g of a sample oil whose water content was adjusted to 100 ppm was weighed in an autoclave, a catalyst (iron, copper, and aluminum wire, all having outer diameter of 1.6 mm×50 mm) and 10 g of each refrigerant (R32, HFO-1234yf, R410A, or n-hexane was used) were sealed therein, and then, it was heated to 175° C., and the appearance and the acid value of the sample oil after 100 hours were measured (JIS C2101). The obtained results are shown in Tables 1 to 3.

It is to be noted that all acid values of the sample oils before the stability test (new oils) were 0.01 mgKOH/g.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| <Base Oil> | | | | | | | | |
| Kind | A-1 | A-2 | A-3 | A-4 | A-1 | A-2 | A-3 | A4 |
| Content (mass %) | 98 | 95 | 95 | 93 | 100 | 100 | 100 | 100 |
| <Additive> (mass %) | | | | | | | | |
| B-1 | 2 | — | 5 | — | — | — | — | — |
| B-2 | — | 5 | — | 7 | — | — | — | — |
| Refrigerant Lubricating Property Test | R32 | R32 | yf | n-C6 | R32 | R32 | yf | n-C6 |
| Test Condition | (1) | (1) | (2) | (4) | (1) | (1) | (2) | (4) |
| Vane Wear Loss (mg) | 5.2 | 5.4 | 5.9 | 5.8 | 13.2 | 14.1 | 15.2 | 14.7 |
| Thermal Stability Test | | | | | | | | |
| Appearance | No Precipitation | No Precipitation | No Precipitation | No Precipitation | No Precipitation | No Precipitation | No Precipitation | No Precipitation |
| Acid Value (mgKOH/g) | 0.01 | 0.01 | 0.03 | 0.01 | 0.01 | 0.01 | 0.03 | 0.01 |

TABLE 2

|  | Example 5 | Example 6 | Example 7 | Example 8 | Example 9 | Example 10 | Example 11 | Example 12 |
|---|---|---|---|---|---|---|---|---|
| <Base Oil> | | | | | | | | |
| Kind | A-1 | A-1 | A-1 | A-1 | A-2 | A-3 | A-4 | A-5 |
| Content (mass %) | 96 | 95 | 92 | 94 | 85 | 93 | 93 | 96 |
| <Additive> (mass %) | | | | | | | | |
| B-1 | 3 | — | 7 | — | 14.8 | — | 6.8 | — |
| B-2 | — | 4 | — | 4.8 | — | 6.8 | — | 2.8 |
| C-1 | 1 | — | — | 1 | — | — | — | — |
| C-2 | — | 1 | — | — | — | — | — | 1 |
| C-3 | — | — | 1 | — | — | — | — | — |
| C-4 | — | — | — | 0.2 | 0.2 | — | — | — |
| C-5 | — | — | — | — | — | 0.2 | — | — |
| C-6 | — | — | — | — | — | — | 0.2 | 0.2 |
| Refrigerant | R32 | yf | 410A | n-C6 | R32 | R32 | yf | n-C6 |
| Lubricating Property Test | | | | | | | | |
| Test Condition | (1) | (2) | (3) | (4) | (1) | (1) | (2) | (4) |
| Vane Wear Loss (mg) | 2.1 | 2.0 | 2.6 | 2.0 | 3.3 | 3.0 | 2.8 | 1.8 |
| Thermal Stability Test | | | | | | | | |
| Appearance | No Precipitation | No Precipitation | No Precipitation | No Precipitation | No Precipitation | No Precipitation | No Precipitation | No Precipitation |
| Acid Value (mgKOH/g) | 0.01 | 0.03 | 0.01 | 0.01 | 0.01 | 0.01 | 0.03 | 0.01 |

TABLE 3

|  | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|
| <Base Oil> | | | | | | | | |
| Kind | A-1 | A-1 | A-1 | A-1 | A-1 | A-2 | A-3 | A-4 |
| Content (mass %) | 98 | 98 | 74 | 99 | 99 | 98.8 | 99.8 | 99.8 |
| <Additive> (mass %) | | | | | | | | |
| B-1 | — | 1 | 25 | — | — | — | — | — |
| B-2 | — | — | — | — | — | — | — | — |
| C-1 | 1 | 1 | 1 | — | — | 1 | — | — |
| C-2 | — | — | — | 1 | — | — | — | — |
| C-3 | — | — | — | — | 1 | — | — | — |
| C-4 | — | — | — | — | — | 0.2 | — | — |
| C-5 | — | — | — | — | — | — | 0.2 | — |
| C-6 | — | — | — | — | — | — | — | 0.2 |
| Refrigerant | R32 | R32 | R32 | yf | 410A | n-C6 | R32 | yf |
| Lubricating Property Test | | | | | | | | |
| Test Condition | (1) | (1) | (1) | (2) | (3) | (4) | (1) | (2) |
| Vane Wear Loss (mg) | 8.6 | 8.5 | 7.8 | 7.6 | 9.0 | 7.5 | 9.2 | 9.2 |
| Thermal Stability Test | | | | | | | | |
| Appearance | No Precipitation | No Precipitation | No Precipitation | No Precipitation | No Precipitation | No Precipitation | No Precipitation | No Precipitation |
| Acid Value (mgKOH/g) | 0.01 | 0.01 | 0.01 | 0.03 | 0.01 | 0.01 | 0.01 | 0.03 |

Regarding stability, as can be seen from Tables 1 to 3, while there is a slight increase in the acid value in combination with HFO-1234yf, the examples and the comparative examples were at problem-free levels.

Regarding a lubricating property, according to the results shown in Table 1, in Examples 1 to 4, the wear loss was drastically reduced compared to Comparative Examples 1 to 4, and it is found that an antiwear effect is large.

Moreover, according to the results shown in Tables 2 and 3, in Examples 5 to 12, it is found that the response of an antiwear property improving effect by the additive is drastically improved by using the additives (B-1), (B-2), and (C-1) to (C-6) in combination. Moreover, according to a comparison between Example 5 and Comparative Examples 5, 7, 8, it is found that the response for increasing the addition effect is decreased when the content of the ester additive according to the present invention is too little or too much.

Industrial Applicability

The refrigerating machine oil composition of the present invention is a refrigerating machine oil that can maintain an antiwear effect and excels in long-time reliability even under severe lubrication conditions, and thus, can be suitably used in a refrigeration/air-conditioning system having high cooling efficiency, in which a compressor, a condenser, a throttle device, an evaporator and the like are included and a refrigerant is made to circulate therebetween, in particular, in a system having a rotary-type, swing-type, or scroll-type compressor, and can be used in the field of room air-conditioners, packaged air conditioners, cold storage chambers, car air-conditioners, industrial refrigerating machines and the like.

The invention claimed is:

1. A refrigerating machine oil composition comprising:
   2 to 20 mass % based on a total amount of the refrigerating machine oil composition of at least one ester additive selected from tetraesters of pentaerythritol and one selected from fatty acids having 5 to 18 carbon atoms and hexaesters of dipentaerythritol and one selected from fatty acids having 5 to 18 carbon atoms;
   a base oil that is an ester other than the ester additive; and
   0.1 to 5 mass % of a phosphate and/or 0.01 to 2 mass % of a sulfide compound based on the total amount of the refrigerating machine oil composition,
   wherein a kinematic viscosity of the refrigerating machine oil composition at 40° C. is 3 to 500 mm$^2$/s.

2. The refrigerating machine oil composition according to claim 1, wherein the ester additive is at least one selected from pentaerythritoltetra(2-ethylhexanoate) and dipentaerythritolhexa(hexanoate).

3. The refrigerating machine oil composition according to claim 1, wherein the kinematic viscosity at 40° C. is 3 to 300 mm$^2$/s.

4. The refrigerating machine oil composition according to claim 1, wherein the base oil is a polyol ester.

5. The refrigerating machine oil composition according to claim 1, wherein the base oil is a polyol ester obtained from pentaerythritol and a mixed acid of a carboxylic acid having 4 to 7 carbon atoms and 3,5,5-trimethylhexanoic acid.

6. The refrigerating machine oil composition according to claim 1, wherein the base oil is a polyol ester obtained from pentaerythritol, a branched butanoic acid, and 3,5,5-trimethylhexanoic acid, wherein a kinematic viscosity of the polyol ester at 40° C. is 30 to 110 mm$^2$/s.

7. The refrigerating machine oil composition according to claim 1, wherein the content of the ester additive is 2 to 7 mass % based on the total amount of the refrigerating machine oil composition.

8. A working fluid composition for refrigerating machines comprising:
   the refrigerating machine oil composition according to claim 1; and
   a refrigerant containing at least one selected from hydrofluorocarbons, hydrofluoroolefins, and hydrocarbons, wherein a global warming potential of the refrigerant is 700 or less.

9. The refrigerating machine oil composition according to claim 1, wherein the phosphate is at least one selected from triphenyl phosphate, tricresyl phosphate, and alkylphenyl phosphates having an alkyl group having 3 or 4 carbon atoms.

10. The refrigerating machine oil composition according to claim 1, wherein the sulfide compound is a thiobisphenol compound.

11. A method for producing a refrigerating machine oil composition comprising:
    blending 2 to 20 mass % based on a total amount of the refrigerating machine oil composition of at least one ester additive selected from tetraesters of pentaerythritol and one selected from fatty acids having 5 to 18 carbon atoms and hexaesters of dipentaerythritol and one selected from fatty acids having 5 to 18 carbon atoms into a base oil that is an ester other than the ester additive to obtain the refrigerating machine oil composition,
    wherein
    the refrigerating machine oil composition comprises 0.1 to 5 mass % based on the total amount of the refrigerating machine oil composition of a phosphate compound and/or 0.01 to 2 mass % based on the total amount of the refrigerating machine oil composition of a sulfide compound and
    a kinematic viscosity of the refrigerating machine oil composition at 40° C. is 3 to 500 mm$^2$/s.

12. The working fluid composition for refrigerating machines according to claim 8, wherein the refrigerant contains difluoromethane (R32).

* * * * *